United States Patent
Doty

[11] Patent Number: 5,358,192
[45] Date of Patent: Oct. 25, 1994

[54] SEAT BELT RETRACTOR HAVING RATTLE SUPPRESSION MECHANISM

[75] Inventor: Gerald A. Doty, Crown Point, Ind.
[73] Assignee: Takata, Inc., Auburn Hills, Mich.
[21] Appl. No.: 123,579
[22] Filed: Sep. 17, 1993

Related U.S. Application Data

[63] Continuation of Ser. No. 795,719, Nov. 21, 1991, abandoned.
[51] Int. Cl.⁵ ............................................. B60R 22/40
[52] U.S. Cl. .................................................. 242/384.5
[58] Field of Search ............... 242/107.4 A, 107.4 B, 242/107.4 R, 107.4 D; 280/806; 297/478

[56] References Cited

U.S. PATENT DOCUMENTS

| | | | |
|---|---|---|---|
| 3,831,878 | 8/1974 | Griffin | 242/107.4 A |
| 4,687,156 | 8/1987 | Mori | 242/107.4 A |
| 4,747,562 | 5/1988 | Tsukamoto et al. | 242/107.4 R |
| 4,749,142 | 6/1988 | Saitow | 242/107.4 R |
| 4,749,143 | 6/1988 | Tsukamoto et al. | 242/107.4 A |
| 4,809,926 | 3/1989 | Koike | 242/107.4 B |
| 4,811,912 | 3/1989 | Takada | 242/107.4 B |
| 4,993,656 | 2/1991 | Tsuge et al. | 242/107.4 A |
| 5,022,601 | 6/1991 | Saitou et al. | 242/107.4 A |
| 5,232,176 | 8/1993 | Doty | 242/107.4 A |

FOREIGN PATENT DOCUMENTS

2351551  1/1990  Fed. Rep. of Germany.

Primary Examiner—John M. Jillions
Attorney, Agent, or Firm—Fitch, Even, Tabin & Flannery

[57] ABSTRACT

A seat belt retractor having a rattle suppression mechanism to be operative when the retractor is not in use including a gear mechanism driven by a seat belt supporting reel and coupled to drive a pawl control mechanism between a first position holding a reel locking pawl in an inoperative position, when the seat belt is fully wound and immobilizing the pawl against rattling, and a second position, when the seat belt is protracted, in which the pawl is released for movement into a locking position with ratchet wheels on the reel. Preferably, the pawl control mechanism includes a gear mechanism that assures that the belt must be wound on the reel before the pawl is driven to engage and is held against an inertia member to prevent rattling therebetween. The pawl is also held spaced from the ratchet teeth, when it is immobilized, to prevent rattling.

17 Claims, 4 Drawing Sheets

SEAT BELT RETRACTOR HAVING RATTLE SUPPRESSION MECHANISM

This application is a continuation, of application Ser. No. 07/795,719 filed Nov. 21, 1991, now abandoned.

FIELD OF THE INVENTION

This invention relates to belt retractors for vehicles and in particular to a rattle suppressor for quieting the rattle occasioned by free movement of the frame-mounted ratchet pawl common to many such devices.

BACKGROUND OF THE INVENTION

In many seat belt retractors, a ratchet wheel is formed on the seat belt retractor reel and is engageable during periods of rapid acceleration or deceleration of the vehicle by a pawl which prevents further withdrawal of the seat belt from the retractor housing. However, during periods of constant speed or modest acceleration, the pawl is typically biased by gravity into a non-engaging position with respect to the ratchet wheel. The freely movable pawl, when not engaged with the seat belt by the urging of the inertial device which responds to vehicle acceleration and deceleration to actuate the pawl, is responsive to vibration of the vehicle, and, unless muffled or suppressed, can produce a rattling noise which may be disturbing to the driver and passengers, particularly to those who are unable to identify the rattle. The rattle is usually the result of metal-to-metal hitting of the pawl against the ratchet teeth on the ratchet wheels. It is accordingly the object of this invention to provide a rattle suppressing improvement for seat belt retractor mechanisms of the kind described.

Any noise suppression system must be substantially fail-proof in that it cannot adversely affect the operation of the retractor from locking at the time of an emergency. Also, such noise suppression retractors must be capable of being cycled, operating under adverse conditions, and meeting all of the safety code specifications of the government and the auto company installing it in a vehicle. The present invention suppresses noise only when the retractor is not in use. Once the seat belt is protracted for use, the noise suppression mechanism is ineffective. Thus, the noise suppression mechanism will not interfere with normal locking of a seat belt retractor when in use.

There have been attempts in the past to reduce noise associated with seat belt retractors. One example of such attempts is U.S. Pat. No. 4,220,294 to DiPaola which utilizes a flexible means for spacing the ratchet pawl from the ratchet teeth. Such means would tend to lessen the sensitivity of the mechanism to the actuator or inertia device. The U.S. Pat. No. 3,862,726 to Ulrich et al. utilizes a means responsive to seat belt protraction to initially block the pawl from engaging the ratchet.

There are also examples of seat belt retractors in which the protraction of the seat belt is used to create a biasing force to urge the pawl to a disengaged position under certain conditions. Examples of such retractors are shown in U.S. Pat. No. 4,749,142 to Saitou, U.S. Pat. No. 4,993,656 to Tsuge et al. and U.S. Pat. No. 5,022,601 to Saitou et al.

SUMMARY OF THE INVENTION

The present invention contemplates the suppression of rattles traceable to vibratory pivotal movement of the ratchet pawl by the maintenance thereon of light pressure toward the disengaged position, such pressure being established by a rattle suppression device in its operative position, and being maintained as long as the belt remains unprotracted. After a predetermined length of belt is withdrawn from the reel, the locking pawl is released from all restraint other than gravity to respond to the inertial means for engaging and forcing the locking pawl into its operative position, restricting belt withdrawal from the reel.

More specifically, the seat belt retractor has a supporting frame having a belt spool secured upon a shaft journaled in the frame. The belt spool has a pair of ratchet wheels with ratchet teeth and a belt coiled upon the spool between the ratchet wheels. The frame is a U-shaped sheet metal stamping comprising a base which is for attachment to the vehicle and a pair of upstanding side plates which house the belt spool and locking pawl. A retractor spring secured to the spool shaft biases the spool to wind the belt back upon the spool when the belt is not under tension.

A locking pawl is freely pivoted in the frame and engageable with the ratchet teeth to prevent withdrawal of the belt from the spool. Normally, the locking pawl is urged out of engagement with the ratchet teeth by weight of a counterbalancing extension of the locking pawl. The inertia weight is movably mounted in the frame and effective upon acceleration or deceleration of the frame to rock the locking pawl into engagement with the ratchet teeth.

A rattle suppressing improvement of the present invention has a blockout means which has a first position which engages and applies a predetermined force to bias the locking pawl to its inoperative position, in which the locking pawl is spaced from engagement with the ratchet teeth of the ratchet wheel. When biased to this position, the locking pawl is prevented from rattling against the ratchet teeth of the ratchet wheels. Additionally, the inertia means is restricted from moving and activating the locking pawl. Secondly, an activating means is selectively biased either to a first position in which the activating means moves the blockout means to the operative position or to a second position in which the activating means moves the blockout means to an inoperative position. A means responsive to protraction of a predetermined belt length is used to move the activation means between its first and second positions. The preferred responsive means has a planetary gear train having a sun gear rotatable with the belt reel, an internal gear affixed to the upstanding side plate and a pair of planet gears engaging the sun gear and the internal gear. The planet gears have projections which engage a pair of pins or plungers in a predetermined rotational and orbital position. When the engagement occurs, the activation means is moved between the first and second positions and in turn moves the blockout means between its operative and inoperative positions.

BRIEF DESCRIPTION OF THE DRAWINGS

A preferred embodiment of the invention is described and explained by reference to the accompanying drawings, in which.

DETAILED DESCRIPTION OF THE INVENTION

Figure 1:
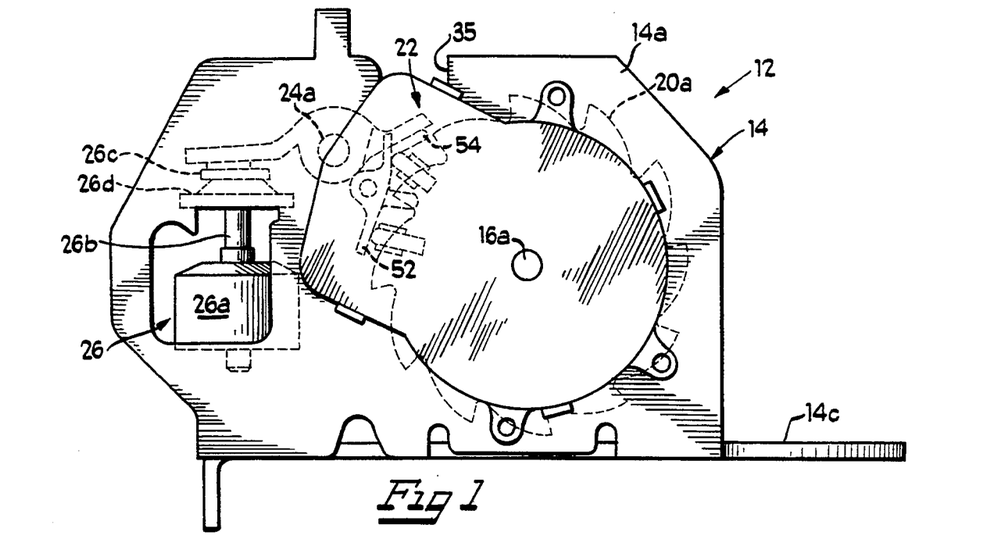
FIG. 1 is a side elevational view of a seat belt retractor embodying the rattle suppression mechanism of the present invention.
Figure 2:
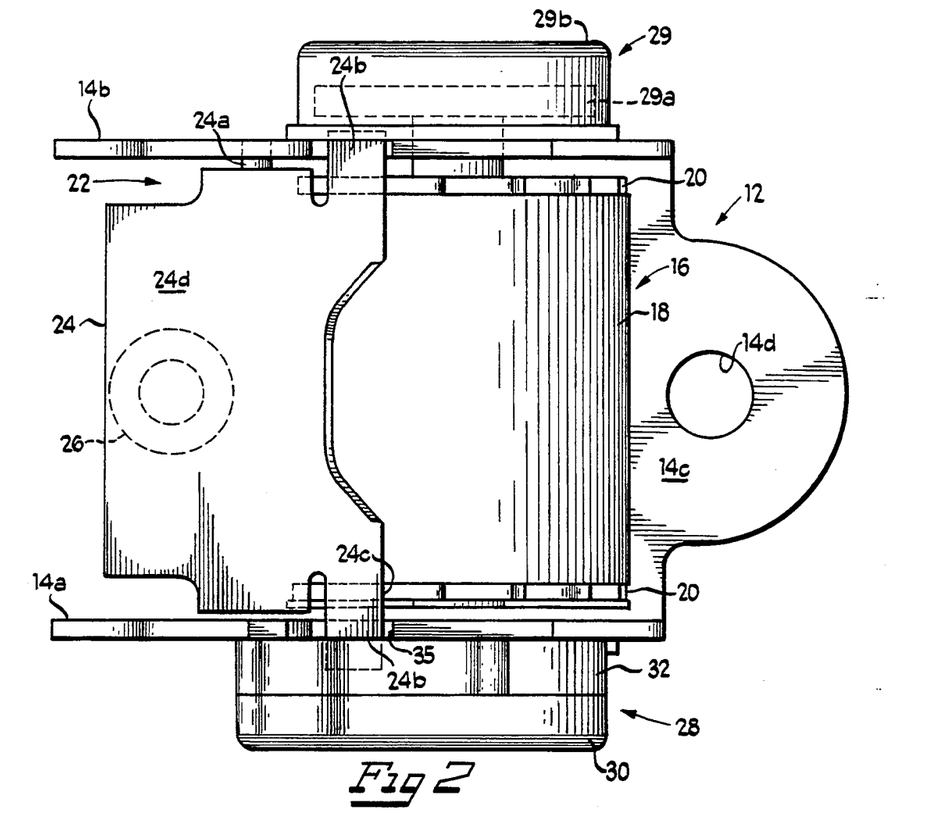
FIG. 2 is a top plan view of the seat belt retractor of FIG. 1.
Figure 3:
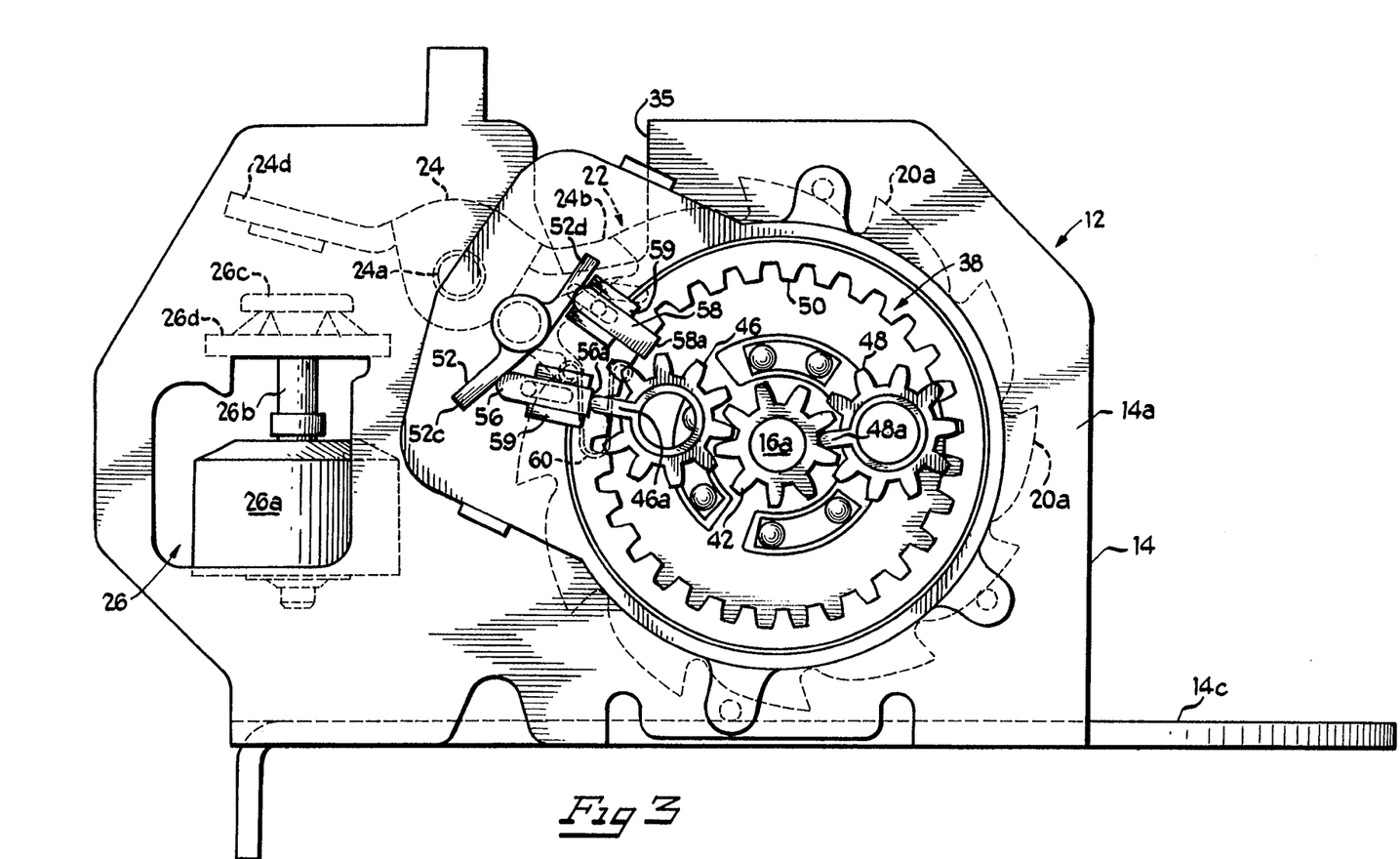
FIG. 3 is an enlarged side elevational view of the seat belt retractor of FIG. 1 with portions of the mechanism housing cut away for illustration purposes.

Referring to FIGS. 1-3, there is shown a seat belt retractor 12 which embodies an anti-rattle or rattle suppressor system of the present invention. Seat belt retractors, which are now required in all passenger cars, have certain basic elements which are typically a source of annoying rattles as vibration occurs in some of the constituent parts. The parts involved relate to the inertia device and the ratchet mechanism included to prevent protraction of the seat belt in an emergency situation as when the inertia device operates on the ratchet to prevent such seat belt protraction.

The seat belt retractor 12 includes a U-shaped frame 14 which has parallel spaced sidewalls or side plates 14a and 14b which are interconnected by base portion 14c. The base portion is formed with openings such as 14d, shown in FIG. 2, to facilitate the mounting of the seat belt retractor 12 in the passenger compartment of an automobile.

Mounted for rotation between the plates 14a and 14b of the frame 14 is a reel or spool 16. The reel 16 includes a shaft 16a which is journaled for rotation about its axis in the side plates 14a and 14b. The reel 16 is also provided with ratchet wheels 20 which are secured to and rotate with the shaft 16a. The ratchet wheels 20, which are conventional in form, are best shown in dotted lines in FIG. 3, and include a plurality of ratchet teeth 20a.

The ratchet wheels 20 form a part of a ratchet mechanism 22 which also includes a locking pawl 24 which is mounted for limited pivotal movement in the side plates 14a and 14b on a shaft 24a. As illustrated in FIG. 2, the pawl extends between the side plates 14a and 14b having oppositely projecting ears 24b which extend outwardly beyond the side plates 14a and 14b and have edges 24c which are adapted to engage the teeth 20a of the ratchet wheels 20 to prevent counterclockwise rotation of the wheel as viewed in FIGS. 1 and 3. For the purpose of biasing the locking pawl 24 to a disengaged position and also for providing means for operating the ratchet mechanism 22 the locking pawl 24 is formed with a plate portion 24d, as shown in FIG. 2, extending to the left of the transversely extending shaft 24a. As will be explained in greater detail below, the underside of the plate portion 24d is engaged at its midpoint by an inertial device 26. The inertial device 26 is conventional and is intended to actuate the ratchet mechanism 22 in emergency situations such as will involve sudden acceleration or deceleration to cause the locking pawl 24 to engage the ratchet wheels 20 preventing further protraction of the seat belt 18.

When driving over bumps or rough roads the pawl 24 may pivot and strike ratchet teeth, causing rattling.

The inertial device 26 is basically a pendulum mechanism including a weight 26a carried by the lower end of a shaft 26b which hangs from a disc 26c. The disc 26c rests on an annular support 26d having an opening through the shaft 26b extends. When the weight 26a is displaced from its central position with shaft 26b disposed vertically, the disc 26c inclines from the horizontal and forces the locking pawl 24 clockwise in such emergency situations. The structure and function of the inertial device 26 are entirely conventional.

The seat belt retractor 12 is provided with a rattle suppression device 28 which is mounted on the outside of the U-shaped frame 14 on the side plate 14a, as shown in FIG. 2. On the other side of the frame 14, adjacent the side plate 14b, there is provided the belt retraction mechanism 29 which consists of a spring 29a mounted within a housing 29b, the spring being a helical spring which biases the reel 16 in a direction to retract the seat belt 18. It should be understood that the particular type of retraction mechanism employed is not significant and has no bearing on the present invention. A single retraction spring might be employed or several springs might be used to apply selectively varying tensions to the seat belt 18. The present invention, however, is concerned with noise suppression with respect to the ratchet mechanism 22. Accordingly, there are instances in which the ratchet mechanism has a tendency to create noise or rattles as its component parts are subject to the vibrations to which an automobile is typically subjected. While it is necessary for safety reasons to permit the ratchet mechanism 22 to operate in an unrestricted fashion in emergency situations, it would be desirable to suppress noise and rattles in the related parts during situations in which the ratchet mechanism 22 need not have unrestricted movement. In furtherance of this objective, the rattle suppression device 28 serves to apply a biasing force on the ratchet mechanism 22 during periods when the seat belt 18 is entirely retracted or only slightly protracted to the extent that it would not be sufficiently protracted to be in use by a vehicle occupant.

Figure 5:
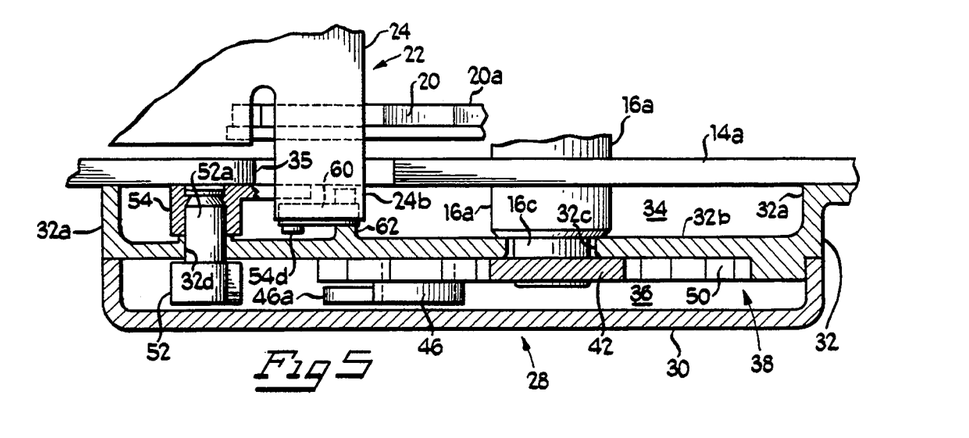
FIG. 5 is a fragmentary top plan view of the seat belt retractor of FIG. 1 with portions cut to expose portions of the rattle suppression mechanism.

The rattle suppression device 28 includes an outer cup-shaped housing member 30 and an inner cup-shaped housing member 32. The inner housing member 32 is secured to the outside surface of the side plate 14a of the frame 14, as shown in FIG. 5. Suitable fasteners secure the housing member 32 against the side plate 14a thereby forming an inner chamber 34 into which the shaft 16a of the reel 16 extends. One of the ears 24b of the locking pawl 24 also extends into the inner chamber 34. It is noted that the side plate 14b is formed with an opening or cutout 35 through which the ear 24b extends into the chamber 34. The inner housing member 32 is formed with a peripheral wall 32a which surrounds a central wall portion 32b. The central wall portion 32b is provided with several openings, one being a centrally located opening 32c through which the reel shaft 16a extends as shown in FIG. 5. The outer end of the reel shaft 16a is received within a gear housing or outer chamber 36 formed by the outer housing member 30 and the central wall portion 32b of the inner housing member 32. The outer housing member 30 is secured to the inner housing member 32 by means of fasteners, not shown, to form the gear housing or outer chamber 36.

The rattle suppression device 28 includes two major components which are a planetary gear system 38 disposed primarily in the chamber 36 and a pawl control mechanism 40 which is located partially within chamber 36 and partially within chamber 34. The planetary gear mechanism 38 is directly connected to the reel shaft 16a and provides means for actuating the rattle suppression device 28 in response to a predetermined extension or protraction of the seat belt 18 from the reel 16. The pawl control mechanism 40 is arranged to be actuated by the planetary gear mechanism 38 and to operate directly on the locking pawl 24.

The planetary gear mechanism 38 includes a sun gear 42 which is secured to the outer end of the reel shaft 16a as best shown in FIG. 5. The end of the reel shaft 16a is formed with a reduced diameter portion 16c which extends through the opening 32c in the wall portion 32b as shown in FIG. 5. The sun gear 42 is keyed to the shaft 16a and is, therefore, driven by the reel 16. The planetary gear mechanism 38 also includes a pair of planet gears 46 and 48 shown in FIG. 3. The planet gears 46 and 48 are driven by the sun gear 42 and also engage an internal gear 50, which is formed integrally with the central wall portion 32b of the inner housing member 32. As shown in FIG. 5, the internal gear 50 is on the outer surface of the wall portion 32b and, therefore, within the outer chamber 36. Thus, the planet gears 46 and 48 are driven by the sun gear 42 which engage the internal gear 50 and rotate around the chamber 36 as the shaft 16a rotates. The planet gears 46 and 48 are confined between the wall of the outer housing member 30 and the wall portion 32b of the inner housing member 32.

Figure 8:
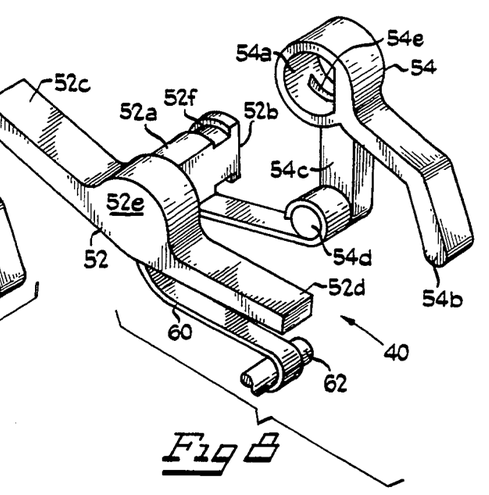
FIG. 8 is a partially exploded view of the activating lever and blockout lever of FIG. 7.
Figure 9:
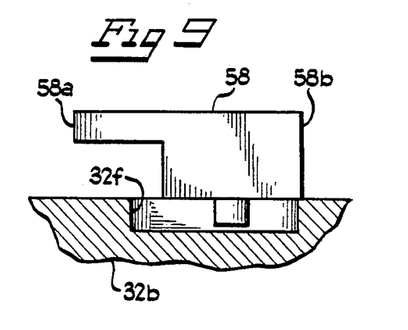
FIG. 9 is an enlarged fragmentary sectional view taken substantially on line 9—9 of FIG. 6.

As mentioned above, the pawl control mechanism 40 is located in the chambers 34 and 36 and includes an actuating means, preferably in the form of an activating or actuating lever 52, and a blockout means, preferably in the form of a lever 54. The actuating lever being disposed in the outer chamber 36 and the blockout lever being disposed in the inner chamber 34. For the purpose of interconnecting the actuating lever 52 and the blockout lever 54, as well as pivotally mounting the pawl control mechanism 40, there is provided a pin 52a which extends laterally from the actuating lever 52 as best shown in FIG. 8. The pin 52a is provided with a flatted portion 52b which is received within a correspondingly shaped opening 54a in the blockout lever 54 so as to secure the levers 52 and 54 together so that they rotate as a unit.

For the purpose of locking the pin 52a against axial displacement with respect to the opening 54a in the blockout lever after assembly, the pin 52a is formed with an undercut portion 52f which receives a flexible wall 54e to lock the actuating lever 52 and the blockout lever 54 in assembled relation. The wall 54e is angled to permit its easy deflection when the pin 52a is inserted into opening 54a. When the wall 54e is received in the undercut portion 52f, it resumes its upright position seated firmly in the undercut portion 52f.

The central wall portion 32b of the inner housing member 32 is formed with an opening 32d through which the pin 52a extends and which serves to journal the pawl control mechanism 40 with respect to the inner housing member 32. Referring again to FIG. 8, the actuating lever 52 is somewhat V-shaped including legs 52c and 52d, which extend from a central hub portion 52e. As best shown in FIG. 3, the legs 52c and 52d extend somewhat tangentially with respect to the hub portion 52e.

As indicated above, the purpose of the planetary gear mechanism 38 is to provide means for controlling the rattle suppression device 28 in response to the protraction of a certain length of the seat belt 18. In accordance with this objective, the planetary gear mechanism 38 is connected and driven by the shaft 16a of the reel 16. For the purpose of interconnecting the planetary gear mechanism with the pawl control mechanism 40, there is included within the outer chamber 36 a pair of actuating plungers 56 and 58. The plungers 56 and 58 are mounted in guide walls 59, formed integrally with the central wall portion 32b to guide the plungers 56 and 58 for rectilinear movement along lines which are radial with respect to the axis of the sun gear 42 and a reel shaft 16a. The central wall portion 32b is formed with elongated slots 32f which receive projections from the adjacent surfaces of the plungers 56 and 58 to limit the extent of rectilinear sliding movement of the plungers between the guide walls 59. The outer housing member 30 slidably engages the plungers 56 and 58 to prevent their outward displacement from the position between guide walls 59. The plungers 56 and 58 have flat inner ends 56a and 58a which are adapted to be engaged by portions of the planet gears 46 and 48 and rounded outer ends 56b and 58b which are adapted to engage the legs 52c and 52d of the actuating lever 52.

Figure 6:
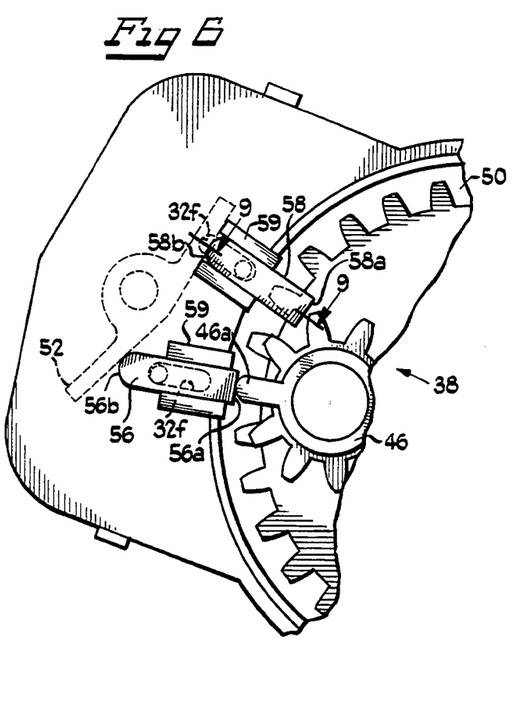
FIG. 6 is an enlarged fragmentary side elevational view showing the action of the planetary gear mechanism.

As is illustrated by FIGS. 3, 5 and 6, the planet gear 46 is formed with an extension bar 46a which is aligned to engage the flatted end 56a of the plunger 56 and urge it radially outwardly when the projection 46a becomes aligned with the plunger 56. Similarly, the planet gear 48 includes a projection 48a, as shown in FIG. 3, which is positioned to engage the plunger 58 when the planet gear 48 progresses around the internal gear 50 to the proper position. As is evident from FIG. 5, the projections 46a and 48a are disposed outwardly of the internal gear 50 and the sun gear 42 so that the projections 46a and 48a do not interfere with the gear teeth on the sun gear 42 or the internal gear 50.

Figure 4:
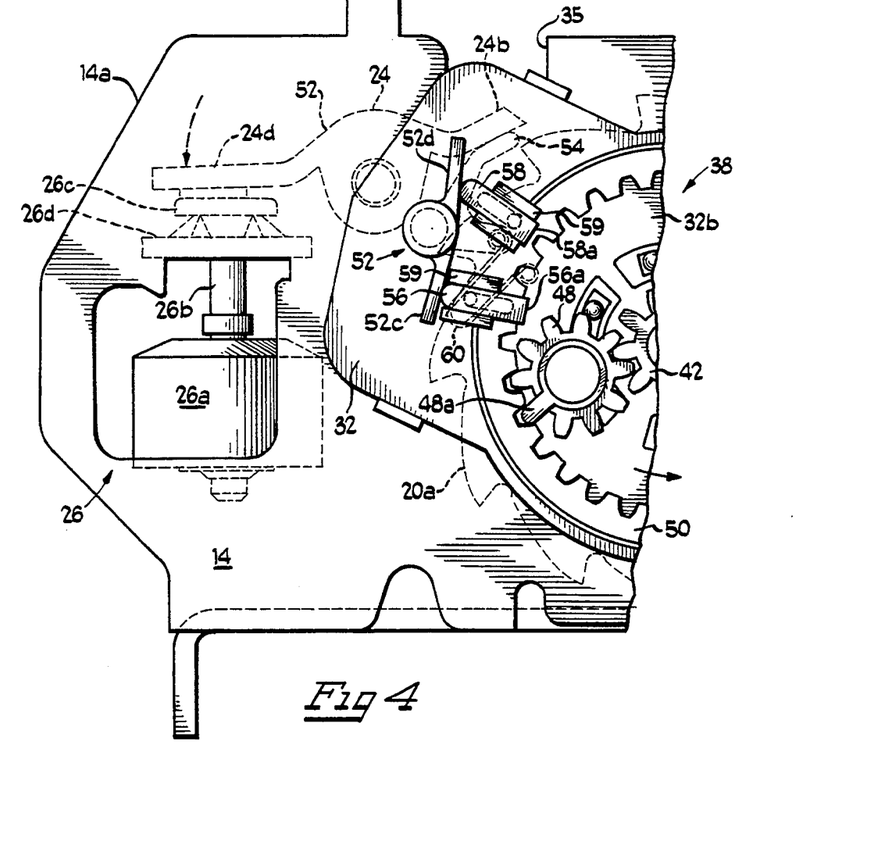
FIG. 4 is a fragmentary side elevational view of the seat belt retractor similar to FIG. 3 but showing the mechanism in the rattle suppression mode.

In the initial position of the rattle suppression device 28 with the seat belt 18 completely retracted, the projection 48a of the planet gear 48 is engaged with the plunger 58 and urges it to its outermost position as shown in FIG. 4. As protraction of the belt occurs, the planet gear 48 moves around counterclockwise along the internal gear 50 as shown in FIG. 4. After a complete rotation of the planet gears around the chamber 36, the planet gear 46, with its projection 46a, arrives at the position shown in FIGS. 3 and 6 when the plunger 56 is then forced outwardly radially to the position shown in FIG. 3, thereby rotating the actuating lever 52 to the position shown in FIG. 3. During this period, as the shaft 16a of the reel 16 rotates during protraction of the seat belt 18, the planetary gear mechanism moves as described with the plunger 58 first being in the outward position rotating the actuating lever 52 to its counterclockwise position of rotation, and after the predetermined increment of belt protraction has taken place, the planet gear 46 forces the plunger 56 outwardly rotating the actuating lever 52 in the clockwise direction. At that time, the plunger 58 is forced inwardly, and since there is no planet gear projection to obstruct its motion inwardly, it slides to the position shown in FIGS. 3 and 6.

Figure 7:
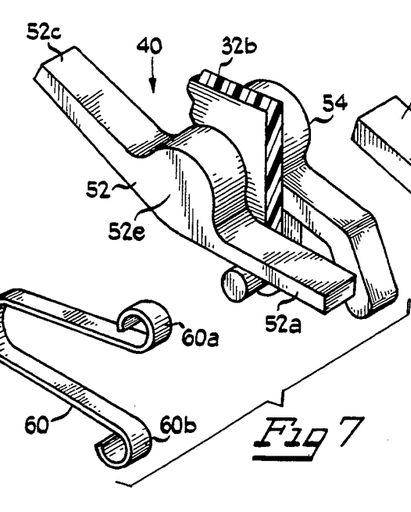
FIG. 7 is an exploded perspective view showing the activating lever and the blockout lever with its biasing spring, these parts being part of the rattle suppression system included in the seat belt retractor of FIGS. 1-6.

Turning now to the portion of the pawl control mechanism 40 located within the inner chamber 34, we note that the blockout lever 54 includes a pawl engaging leg 54b and a spring support leg 54c. The spring support leg 54c has a lateral projection 54d which receives one end of a biasing spring 60, as shown in FIGS. 7 and 8. The end of the spring 60, remote from the blockout lever 54, is received on a projection 62 which extends inwardly from the central wall portion 32b of the inner housing member 32, as shown in FIG. 5. The spring 60 is shown as being V-shaped and having formed ends 60a and 60b which are received on the projection 54d and the projection 62 respectively as shown in FIG. 8. The purpose of the spring 60 is to bias the pawl control mechanism 40 in either of two directions. The projection 54d is located between the axis of the actuating lever pin 52a and the projection 62 so that there is a over-center movement causing the spring 60 to urge the pawl control mechanism 40 in a clockwise direction in one instance and in a counterclockwise direction in another instance. Thus, as shown in FIG. 4, the spring 60 tends to rotate the pawl control mechanism 40 counterclockwise while as shown in FIG. 3 the spring 60 tends to rotate the pawl control mechanism 40 in a clockwise direction. The result of this over-center spring action is that the pawl control mechanism tends to remain in the position to which it has been urged by one or the other of the plungers 56 or 58.

The purpose of the pawl control mechanism as alluded to above is to apply a force on the locking pawl 24 during a certain portion of the protraction cycle of the seat belt 18. Before there has been any protraction of the seat belt 18 and for some amount of protraction thereafter until such time as a seat belt 18 has been extended to surround and secure a passenger, there is no purpose or function for the inertial device 26 which is basically intended to block the belt protraction movement of the reel 16 in an emergency situation such as a collision. Before the seat belt is protracted to a sufficient extent to be in use by a passenger, it would be advantageous to immobilize the parts of the inertial device and the locking pawl which tend to rattle or create noise as a consequence of the normal vibration encountered in an automobile. It is contemplated that the locking pawl 24 be utilized to immobilize the inertial device 26 during this period when neither the locking pawl or the inertial device can serve any useful function. While the locking pawl 24 is normally biased by gravity to the position out of engagement with the ratchet wheels 20 and into engagement with the inertial device 26, the locking pawl 24 and the inertial device 26 are still subject to the rattling and noise generation problems discussed above.

As is best shown in FIG. 4, the blockout lever 54 is adapted to engage the ratchet-engaging ear 24b and urge the locking pawl 24 in a counterclockwise direction as shown by the arrow in FIG. 4. This counterclockwise urging is accomplished by the plunger 58 which at its outer rounded end 58b engages the leg 52d of the actuating lever 52, thereby positioning the pawl control mechanism 40 so that the spring 60 biases the pawl control mechanism 40 in a counterclockwise direction as shown in FIG. 4, whereby the blockout lever 54 with its leg 54b engages the locking pawl 24 and rotates it counterclockwise as shown in FIG. 4.

Upon protraction of a sufficient amount of seat belt 18 to cause the planetary gear mechanism 38 to progress to the position shown in FIG. 3, the plunger 56 is then forced outwardly with its rounded outer end 56b engaging against the leg 52c of the actuating lever 52, causing the pawl control mechanism 40 to rotate clockwise to the position shown in FIG. 3, at which time the leg 54b of the blockout lever 54 is moved away from the locking pawl 24 to the position shown in FIG. 1, leaving sufficient clearance for the inertial device 26 to rotate the locking pawl 24 into engagement with the ratchet wheels 20.

From the foregoing it should be appreciated that the rattle suppression device 28 provides a simple and effective means for immobilizing the locking pawl and the inertial device of a seat belt retractor during a period in which the seat belt 18 is either not protracted or is only protracted a minimal amount. There are many instances in which seat belt retractors are not in use in spite of the fact that the vehicle in which they are installed is moving and subjected to vibration. There are many instances in which the seat belts of passengers are not in use since the driver is alone in the vehicle. In all such instances it is desirable to maintain the unused seat belts in as quiet a condition as possible. The present invention makes possible, through a provision of a small number of inexpensive plastic parts, means restraining the parts of the emergency locking mechanism against movement and vibration until such time as the seat belt is protracted sufficiently to indicate it is being used by some passenger in the vehicle.

What is claimed is:

1. A seat belt retractor comprising:
 a retractor frame,
 a reel having a reel shaft journaled for rotation in the retractor frame and having a seat belt wound thereon,
 a retractor spring supported by the retractor frame and being connected to bias the reel in a belt-winding direction and permitting the belt to rotate the reel in a belt-unwinding direction as it is unwound from the reel,
 a ratchet wheel coupled to the reel for rotation therewith and having ratchet teeth disposed thereon,
 a locking pawl pivotally mounted on the retractor frame for rotation between an inoperative position spaced from engagement with the ratchet teeth and an operative position engaged with the ratchet teeth to lock the reel against rotation in the belt-unwinding direction,
 an inertial device for actuating the locking pawl and responsive to a predetermined acceleration force on the retractor to move the locking pawl to the operative position, the inertial device comprising a mass which occupies a central position under the force of gravity and is laterally displaceable in response to acceleration forces, the locking pawl having its center of gravity laterally spaced from its pivotal mounting so that the locking pawl pivots under gravitational force to the inoperative position in which it applies a downward force on the mass,
 a rattle suppressing mechanism including a gear mechanism driven by the reel and a pawl control mechanism carried by the retractor frame for movement between a first position for immobilizing the locking pawl against rattling engagement and a second position of non-actuation of the locking pawl,
 the gear mechanism being disposed to maintain the pawl control mechanism in the first position when the reel is positioned with the seat belt entirely retracted thereon and during the initial protraction of a length of seat belt less than that required to secure a passenger with the seat belt, the gear mechanism being disposed to rotate the pawl control mechanism from the first position to the second position as the seat belt is protracted beyond said initial protraction, and a biasing spring connected between the retractor frame and the pawl control mechanism for selectively biasing the pawl control mechanism into whichever of the first and second positions it is displaced by the gear mechanism.

2. The retractor of claim 1 in which the ratchet wheel and locking pawl are made of metal and may make a metallic clicking noise when the locking pawl bounces against the ratchet wheel.

3. A seat belt retractor as recited in claim 1 wherein the pawl control mechanism comprises a multiarm lever pivotally carried by the retractor frame, the biasing spring acting on one of the arms of the multiarm lever to provide an over-center spring mechanism which in the first position biases the multiarm lever into engagement with the locking pawl which then engages the inertial device.

4. A seat belt retractor as recited in claim 3 wherein the biasing spring exerts a force on the multiarm lever when the pawl control mechanism is in the second position to rotate the multiarm lever out of engagement with the locking pawl.

5. A seat belt retractor as recited in claim 4 wherein the multiarm lever comprises an actuating lever and a blockout lever which are secured together to pivot as a unit about a common axis, the actuating lever having oppositely extending arms which are alternatively driven by the gear mechanism to rotate the pawl control mechanism to either of the first and second positions, the blockout lever having a pair of arms one of which is secured to the biasing spring and the other of which engages the locking pawl in the first position of the pawl control mechanism.

6. A seat belt retractor as recited in claim 5 wherein the gear mechanism comprises a planetary gear system having a sun gear driven by the reel and planet gears which are positioned to rotate the actuating lever at the fully retracted position of the seat belt and at the position of protraction of said length of seat belt.

7. A seat belt retractor as recited in claim 6 wherein each of the planet gears are provided with radial projections displaced axially from peripheral teeth formed on the planet gears, a pair of plungers slidably mounted on the retractor frame and movable in a direction radial of the axis of rotation of the reel, the projections on the planet gears driving the plungers into engagement with the arms of the actuating lever to rotate the pawl control mechanism to either of said first and second positions.

8. A seat belt retractor as recited in claim 6 wherein the retractor frame includes a pair of spaced parallel side plates in which the reel is journaled and the locking pawl is pivotally mounted, a cup-shaped housing member secured to one of the side plates to form a chamber, the housing member having a flat wall portion surrounded by a peripheral wall, the locking pawl having a portion extending into the chamber and the reel shaft extending through the chamber, the gear mechanism being supported outside of the chamber on one side of the flat wall portion and the pawl control mechanism being pivoted in the flat wall portion with the blockout lever being disposed in the chamber and the actuating lever being disposed outside of the chamber.

9. A seat belt retractor as recited in claim 8 wherein the blockout lever and the actuating lever are secured together by a pin extending from one into a complementary opening formed in the other, the pin providing a journal portion between the levers when the levers are joined together, the journal portion being received in an opening in the flat wall portion to mount the multiarm lever for pivotal movement about the pin.

10. A seat belt retractor comprising:

a retractor frame including parallel spaced side plates, a reel having a supporting shaft journaled for rotation in the side plates and having a seat belt wound thereon, retractor spring means supported on the retractor frame and being connected to the reel to bias the reel in a belt retracting direction and to permit the reel to rotate in a belt protracting direction to unwind the belt from the reel, a pair of ratchet wheels secured to the reel on opposite sides of the belt and having peripherally disposed teeth, the ratchet wheels bearing the load of a passenger against further belt protraction at the time of emergency, a locking pawl extending between the side plates and being supported for pivotal movement about an axis parallel to the reel supporting shaft and movable between an inoperative position spaced from the ratchet teeth and an operative position engaged with the ratchet teeth to lock the reel against rotation in the belt protracting direction bearing loads applied by the belt in the belt protracting direction at the time of an emergency, an inertial device mounted on the retractor frame between the side plates and having an acceleration responsive member connected to actuate the locking pawl to the operative position when the retractor is subjected to at least a predetermined level of acceleration, the locking pawl having its center of gravity displaced with respect to its axis of pivotal mounting so that the locking pawl is gravity biased into engagement with the inertial device and out of said operative position, a rattle suppression mechanism which is driven by the reel, which engages and biases the locking pawl to the inoperative position and immobilizes the acceleration responsive member only when the seat belt is fully wound onto the reel and during an initial protraction of a length of seat belt less than that necessary to secure a passenger with the belt and which disengages and withdraws the bias on the locking pawl when the seat belt is protracted beyond the length of the initial protraction and less than that necessary to secure a passenger with the belt, and the rattle suppression mechanism including a pawl control mechanism, the pawl control mechanism having a multiarm lever pivotally carried by the retractor frame and driven by the reel to rotate the pawl control mechanism to either the inoperative position to engage and bias the locking pawl or so to disengage and withdraw bias on the locking pawl.

11. A seat belt retractor comprising:

a retractor frame including parallel spaced side plates, a reel having a supporting shaft journaled for rotation in the side plates and having a seat belt wound thereon, retractor spring means supported on the retractor frame and being connected to the reel to bias the reel in a belt retracting direction and to permit the reel to rotate in a belt protracting direction to unwind the belt from the reel, a pair of ratchet wheels secured to the reel on opposite sides of the belt and having peripherally disposed teeth, a locking pawl extending between the side plates and being supported for pivotal movement about an axis parallel to the reel supporting shaft and movable between an inoperative position spaced from the ratchet teeth and an operative position engaged with the ratchet teeth to lock the reel against rotation in the belt protracting direction, an inertial device mounted on the retractor frame between the side plates and having an acceleration responsive member connected to actuate the locking pawl to the operative position when the retractor is subjected to at least a predetermined level of acceleration, the locking pawl having its center of gravity displaced with respect to its axis of pivotal mounting so that the locking pawl is gravity biased into engagement with the inertial device and out of said operative position, a rattle suppression mechanism which is driven by the reel and which biases the locking pawl to the inoperative position and immobilizes the acceleration responsive member when the seat belt is fully wound onto the reel and during an initial protraction of a length of seat belt less than that necessary to secure a passenger with the belt and withdraws the bias on the locking pawl when the seat belt is protracted beyond the length of seat belt less than that necessary to secure a passenger with the belt, the acceleration responsive member is disposed centrally in the inertial device and is displaced laterally by acceleration of the retraction to actuate the locking pawl, the acceleration responsive member being loosely supported in the inertial device, the locking pawl immobilizing the acceleration responsive member by direct engagement when biased to the inoperative position by the rattle suppression mechanism, the rattle suppression mechanism including a gear mechanism and a pawl control mechanism, the gear mechanism being driven by the reel and having an output connected to the pawl control mechanism, the gear mechanism moving the pawl control mechanism into either a first position biasing the locking pawl to its inoperative position or a second position disengaged from the locking pawl, and the pawl control mechanism comprising a multiarm lever which is pivotally mounted with respect to the retractor frame for movement between first and second positions, and an over center spring means connected between the retractor frame and the multiarm lever to apply a biasing force to maintain the multiarm lever in either of the first and second positions.

12. A seat belt retractor comprising:
a retractor frame including parallel spaced side plates,
a reel having a supporting shaft journaled for rotation in the side plates and having a seat belt wound thereon, retractor spring means supported on the retractor frame and being connected to the reel to bias the reel in a belt retracting direction and to permit the reel to rotate in a belt protracting direction to unwind the belt from the reel, a pair of ratchet wheels secured to the reel on opposite sides of the belt and having peripherally disposed teeth, a locking pawl extending between the side plates and being supported for pivotal movement about an axis parallel to the reel supporting shaft and movable between an inoperative position spaced from the ratchet teeth and an operative position engaged with the ratchet teeth to lock the reel against rotation in the belt protracting direction, an inertial device mounted on the retractor frame between the side plates and having an acceleration responsive member connected to actuate the locking pawl to the operative position when the retractor is subjected to at least a predetermined level of acceleration, the locking pawl having its center of gravity displaced with respect to its axis of pivotal mounting so that the locking pawl is gravity biased into engagement with the inertial device and out of said operative position, a rattle suppression mechanism which is driven by the reel and which biases the locking pawl to the inoperative position and immobilizes the acceleration responsive member when the seat belt is fully wound onto the reel and during an initial protraction of a length of seat belt less than that necessary to secure a passenger with the belt and withdraws the bias on the locking pawl when the seat belt is protracted beyond the length of seat belt less than that necessary to secure a passenger with the belt, the acceleration responsive member is disposed centrally in the inertial device and is displaced laterally by acceleration of the retraction to actuate the locking pawl, the acceleration responsive member being loosely supported in the inertial device, the locking pawl immobilizing the acceleration responsive member by direct engagement when biased to the inoperative position by the rattle suppression mechanism, the rattle suppression mechanism including a gear mechanism and a pawl control mechanism, the gear mechanism being driven by the reel and having an output connected to the pawl control mechanism, the gear mechanism moving the pawl control mechanism into either a first position biasing the locking pawl to its inoperative position or a second position disengaged from the locking pawl, and the gear mechanism includes a first and a second rotating gear element and a first and second slidable actuator, the slidable actuators being carried by the retractor frame and being sequentially engaged and displaced by one of the rotating gear elements, the actuators being positioned to engage the pawl control mechanism so that the displacement of the first slidable actuator moves the pawl control mechanism to the first position and displacement of the second slidable actuator moves the pawl control mechanism to the second position.

13. A seat belt retractor as recited in claim 12 wherein the first rotating gear element is positioned to displace the first slidable actuator when the seat belt is completely retracted on the reel and upon protraction of the seat belt the first rotating gear element disengages from the first slidable actuator, upon protraction of on the order of one foot of seat belt the second rotating gear element engages and displaces the second slidable actuator to move the pawl control mechanism to the second position and upon further protraction of the seat belt the rotating gear elements remain disengaged from the slidable actuators.

14. A seat belt retractor as recited in claim 13 wherein the pawl control mechanism includes an over center spring which applies a biasing force to maintain the pawl control mechanism in either of the first or second positions depending on whichever position it is placed in by the gear mechanism.

15. A seat belt retractor as recited in claim 13 wherein the gear mechanism includes a planetary gear train having a sun gear driven by the reel shaft, the first and second rotating gear elements comprise planet gears rotating in engagement with the sun gear and having projections which extend beyond teeth on the planet gears to engage the slidable actuators.

16. A seat belt retractor comprising:

a retractor frame;

a reel having a belt wound rotatably mounted thereupon in the retractor frame for protraction of the belt from the reel with the reel turning in a belt unwinding direction and for retraction of the belt onto the reel with the reel turning in a belt winding direction;

a reel shaft mounting the reel for rotation in the retractor frame;

a retractor spring biasing the reel to turn in the belt winding direction to retract the belt onto the reel;

a ratchet wheel having ratchet teeth and being coupled to the reel;

a locking pawl pivotally mounted on the retractor frame and movable from an inoperative position in which the locking pawl is spaced from engagement with the ratchet teeth to an operable locking position in which the locking pawl engages the ratchet teeth of the ratchet wheel and locks the reel against further turning in the belt unwinding direction;

an inertial means mounted on the retractor frame movable upon a predetermined acceleration or deceleration to actuate the locking pawl to the operable locking position; and a rattle suppressing means for suppressing vibration of the locking pawl into and out of engagement with the ratchet teeth of the ratchet wheel and activated by a means responsive to rotation of the reel shaft upon unwinding of a predetermined length of the belt, the rattle suppressing means comprising the combination of;

a blockout lever in a first operative position engages and applies a sufficient force to bias the locking pawl to its inoperative position, where the locking pawl is spaced from engagement with the ratchet teeth of the ratchet wheel to prevent the rattling of the locking pawl against the ratchet teeth, and whereby the locking pawl applies pressure to the inertial means and the inertial means is restricted from moving, an activating lever selectively biased either to a first position in which the activating lever moves the blockout lever to the first operative position or to a second position in which the activating lever disengages the blockout lever from restraining the locking pawl from engaging the ratchet teeth, and the means responsive to rotation of the reel shaft includes a planetary gear train having a sun gear rotatable with the belt reel, an internal gear affixed to the retractor frame and a plurality of planet gears engaging the sun gear and the internal gear, a projection on each of the planet gears and a pair of pins slidably supported by the retractor frame and engageable by the projections on the planet gears in predetermined rotational and orbital positions thereof and upon such engagements movable to engage and shift the activating lever between the first and second positions.

17. In a seat belt retractor for vehicles, the retractor having a supporting frame, a belt spool secured upon a shaft journaled in the frame and having a pair of end plates between which a belt is coiled upon the spool, the end plates having ratchet teeth formed about their peripheries, a retractor spring secured to the spool shaft to resist the withdrawal of the belt from the spool and to wind the belt on the spool for storage, a locking pawl freely pivoted on the frame and engageable with the ratchet teeth to prevent withdrawal of the belt from the spool, the locking pawl being normally urged out of engagement with the ratchet teeth by weight of a counterbalancing extension of the locking pawl beyond its pivot, and an inertial weight movably mounted in the frame and effective upon acceleration or deceleration of the frame to rock the locking pawl into engagement with the ratchet teeth, a rattle suppressing improvement comprising a blockout lever having a first operative position in which it engages and applies a sufficient predetermined force to bias the locking pawl to its inoperative position wherein the locking pawl is spaced from engagement with the ratchet teeth of the ratchet wheel to prevent the rattling of the locking pawl against the ratchet teeth and whereby the locking pawl applies pressure to the inertial means the inertia means is restricted from moving and activating the locking pawl, and an activating lever selectively biased either to a first position in which the activating lever moves the blockout lever to the operative position or to a second position in which the activation lever disengages the blockout lever from the locking pawl, moving the blockout lever to an inoperative position, the activating lever and the blockout lever form a single activating and suppressing mechanism, a pin securing together the activating lever and the blockout lever, and the supporting frame is a U-shaped sheet metal stamping comprising a base which is adapted for attachment to the vehicle and a pair of upstanding side plates which house the belt spool and locking pawl and journal the belt spool shaft, the locking pawl is pivotally mounted to the upstanding sides to transmit the restraining force of the locking pawl to the frame, attached to one of the upstanding side plates is a means responsive to rotation of the belt reel which includes a planetary gear train having a sun gear rotatable with the belt reel, an internal gear affixed to the upstanding side plate and a plurality of planet gears engaging the sun gear and the internal gear, projections on the planet gears, a pair of pins slidably mounted on the frame to engage the activating lever and engageable by the projections on the planet gears to slide the pins and shift the activating lever between the first and second positions.

* * * * *